United States Patent [19]

Sinclair et al.

[11] Patent Number: 5,428,293
[45] Date of Patent: Jun. 27, 1995

[54] LOGGING WHILE DRILLING APPARATUS WITH MULTIPLE DEPTH OF RESISTIVITY INVESTIGATION

[75] Inventors: Paul L. Sinclair, Clear Lake Shores; Shey-Min Su; Roland E. Chemali, both of Austin, all of Tex.

[73] Assignee: Halliburton Logging Services, Inc.

[21] Appl. No.: 149,023

[22] Filed: Nov. 8, 1993

Related U.S. Application Data

[63] Continuation of Ser. No. 780,581, Oct. 22, 1991, abandoned.

[51] Int. Cl.$^6$ .............................................. G01V 3/30
[52] U.S. Cl. ................................... 324/339; 324/335
[58] Field of Search ............... 324/335, 338, 339, 356, 324/369

[56] References Cited

U.S. PATENT DOCUMENTS

| | | | |
|---|---|---|---|
| 3,115,942 | 12/1963 | Arps | 324/356 |
| 3,259,837 | 7/1966 | Oshry | 324/339 |
| 3,305,771 | 2/1967 | Arps | 324/6 |
| 3,551,797 | 12/1970 | Gouilloud et al. | 324/6 |
| 3,849,721 | 11/1974 | Calvert | 324/6 |
| 4,107,597 | 8/1978 | Meador et al. | 324/6 |
| 4,185,238 | 1/1980 | Huchital et al. | 324/338 |
| 4,209,747 | 6/1980 | Huchital | 324/338 |
| 4,278,941 | 7/1981 | Freedman | 324/341 |
| 4,300,098 | 11/1981 | Huchital et al. | 324/338 |
| 4,451,789 | 5/1984 | Meador | 334/338 |
| 4,461,997 | 7/1984 | Ohmer | 334/338 |
| 4,511,842 | 4/1985 | Moran et al. | 324/338 |
| 4,511,843 | 4/1985 | Thoraval | 324/338 |
| 4,536,714 | 8/1985 | Clark | 324/338 |
| 4,538,109 | 8/1985 | Clark | 324/338 |
| 4,553,097 | 11/1985 | Clark | 324/338 |
| 4,622,518 | 11/1986 | Cox et al. | 324/341 |
| 4,626,785 | 12/1986 | Hagiwara | 324/339 |
| 4,651,101 | 3/1987 | Barber et al. | 324/339 |
| 4,651,121 | 3/1987 | Furubayashi et al. | 338/35 |
| 4,652,829 | 3/1987 | Safinya | 324/338 |
| 4,692,706 | 9/1987 | Mazzagatti et al. | 324/338 |
| 4,730,161 | 3/1988 | Cox et al. | 324/338 |

FOREIGN PATENT DOCUMENTS

0289418 11/1988 European Pat. Off. .
0314573 5/1989 European Pat. Off. .
2178170 2/1987 United Kingdom .

OTHER PUBLICATIONS

Huchital et al., The Deep Propagation Tool, Society of Petroleum Engineers, SPE 10988, 1981.
Besson et al., Environmental Effects on Deep Electromagnetic Logging Tools, SPWLA, Jun., 1986.
Blenkinsop et al., Deep Electromagnetic Propagation Tool Interpretation, SPWLA, Jun. 1986.
Log Interpretation Principles/Applications, pp. 132, 133, Oct. 1987.
Franz, "Downhole Recording System for MWD", SPE 10054, Oct. 1981.
Rodney et al., "The Electromagnetic Wave Resistivity MWD Tool", SPE 12167 Oct. 1983.
Coope et al., "Formation Evaluation Using Measurements Recorded While Drilling", SPWLA Twenty-Fifth Annual Logging Symposium, Jun. 1984.

(List continued on next page.)

*Primary Examiner*—Walter E. Snow
*Attorney, Agent, or Firm*—Arnold, White & Durkee

[57] ABSTRACT

In an MWD system, a mandrel for connection to the drill bit is set forth which supports shallow, intermediate and deep measuring resistivity systems. By transmitting upwardly and downwardly in alternate fashion, and receiving the transmitted signal at pairs of receiver coils, transmitted signal phase shift and attenuation are measured. A method of measuring is set forth which includes making resistivity measurements close to the drill bit at increasing ranges from the borehole so that formation resistivity prior to fluid invasion is obtained. Measurements are thus provided of formation resistivity before, during and after fluid invasion. The method also accommodates formations which have a relative dip angle with respect to the well borehole.

28 Claims, 9 Drawing Sheets

OTHER PUBLICATIONS

Coope et al., "The Theory of 2 MHz Resistivity Tool and its Application to Measurement-While Drilling", The Log Analyst, May-Jun. 1984.

Hendricks et al., "MWD: Formation Evaluation Case Histories in the Gulf of Mexico", SPE 13187, Sep. 1984.

Holbrook, "The Effect of Mud Filtrate Invasion on the EWR Log-A Case History", SPWLA Twenty-Sixth Annual Logging Symposium, Jun. 1985.

Coope et al., "Formation Evaluation Using ERW Logs", SPE 14062, Mar. 1986.

Rodney et al., "Electromagnetic Wave Resistivity MWD Tool", SPE Drilling Engineering, Oct. 1986.

Grief et al., "Petrophysical Evaluation of Thinly Beded Reservoirs in High Angle/Displacement Development Wells with the NL Recorded Lithology Logging System", The Log analyst, Sep.-Oct. 1986.

Gianzero et al., "A New Resistivity Tool For Measurement-While-Drilling", SPWLA Twenty-sixth Annual Logging Symposium, Jun. 1985.

Gianzero et al., "Determining the Invasion Near the Bit with the M.W.D. Toroid Sonde", SPWLA Twenty-Seventh Annual Logging Symposium, Jun. 1986.

Chin et al., "Formation Evaluation Using Repeated MWD Logging Measurements", SPWLA 27th Annual Logging Symposium, Houston, Texas, Jun. 9-13, 1986.

Coope et al., "Evaluation of Thin Beds and Low Resistivity Pays Using EWR Logs", Transactions of the Tenth European Formation Evaluation Symposium, Aberdeen, Scotland, Apr. 22, 1986.

"Drillcom", Literature: RLL Recorded Lithology Logging System, Measurements While Drilling Technical Specifications, 1985.

Elloitt et al., "Recording Downhole Formation Data While Drilling", Journal of Petroleum Technology, Jul. 1985.

Koopersmith et al., "Environmental Parameters Affecting Neutron Porosity, Gamma Ray, and Resistivity Measurements Made While Drilling", Society of Petroleum Engineers publication SPE 16758, Sep. 27-30, 1987.

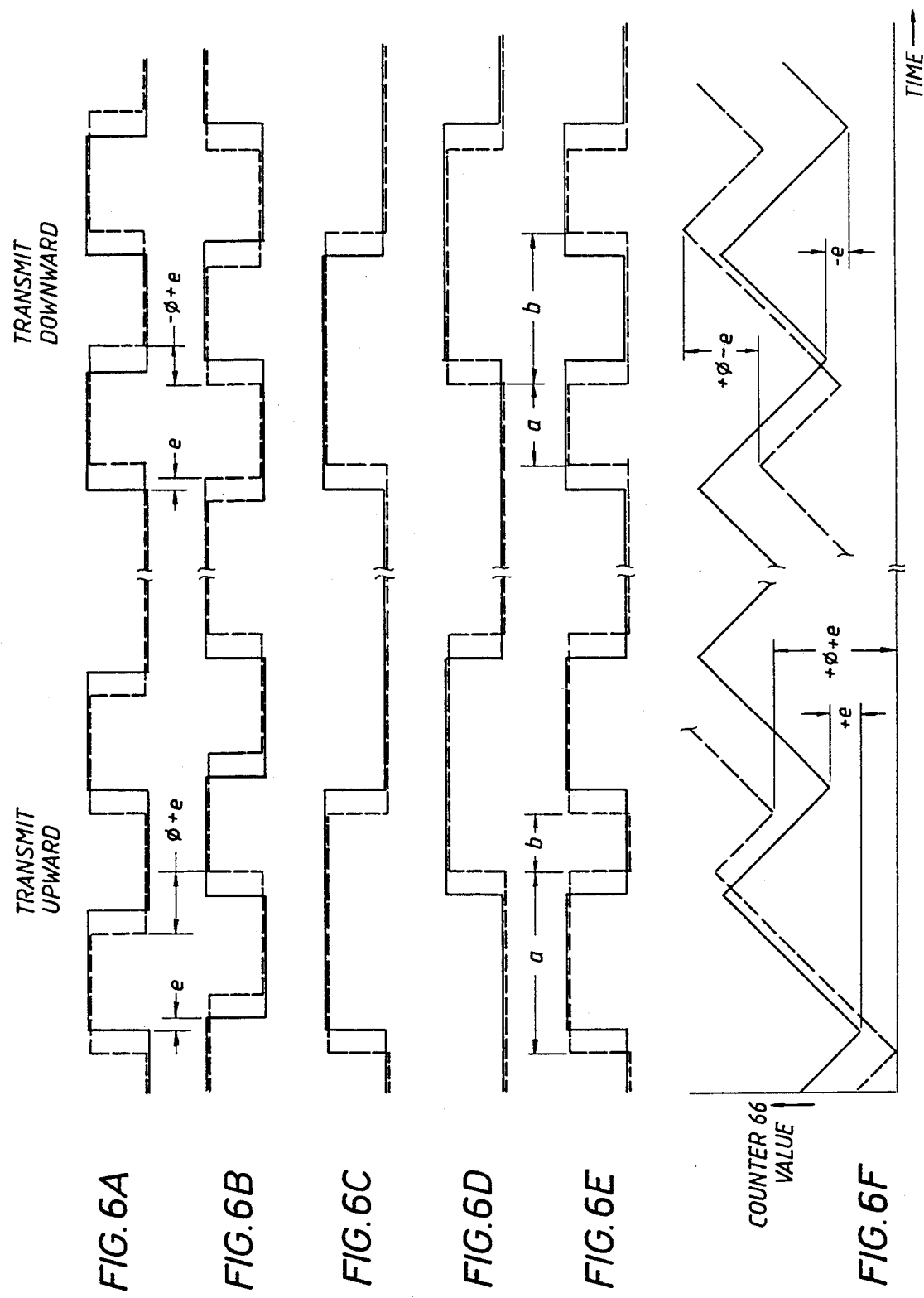

LOGGING WHILE DRILLING APPARATUS WITH MULTIPLE DEPTH OF RESISTIVITY INVESTIGATION

This application is a continuation of application Ser. No. 780,581, filed Oct. 22, 1991.

BACKGROUND OF THE INVENTION

Several methods of resistivity logging while drilling have been developed in the past. A method using toroidal coils around the drill stem mandrel to act as low frequency current transmitters and receivers (Arps U.S. Pat. No. 3,305,771) is currently employed and provides resistivity logs similar to the wireline laterolog tools. The high frequency wave propagation method (Gouilloud et al U.S. Pat. No. 3,551,797) provides logs similar to the wireline induction tools, and is currently employed widely in the industry. Recently the wave propagation method was improved by the incorporation of the borehole compensation feature and the dual depth of investigation feature (Clark et al U.S. Pat. No. 4,968,940). Both of these recent improvements, however, had been previously disclosed by Calvert (U.S. Pat. No. 3,849,721) and Huchital (U.S. Pat. No. 4,209,741) respectively, and the Clark disclosure builds on the combination of the previous ideas.

It has been standard practice in wireline resistivity logging tools to provide three measurements with different radial penetration, this being the minimum number required to solve quantitatively even the simplest model of formation invasion. While these methods are highly successful, the wireline data are gathered usually days or weeks after important reservoir rocks have been drilled, and can only observe the possibly damaging effects of drilling at excessive borehole pressure, resulting in severe invasion and possible plugging of porous formations by water or other borehole fluids. This may at the least require costly remedial actions, or, at the worst, result in an oil bearing formation being misinterpreted as water laden by the drilling fluid filtrate.

There is clearly a great value in observing invasion quantitatively while drilling (or immediately thereafter) so that the drilling engineer can adjust mud weights optimally. Similarly, the correction of resistivity data for invasion effects allows more accurate calculation of the hydrocarbon content of rocks which is of great importance in estimating reservoir potential. This can best be achieved as soon as possible after drilling. Analysis of the trend of resistivity data in otherwise uniform rock formations has been widely used as a predictor of over pressure mud conditions, so this information may also be used by the drilling engineer to adjust mud weights.

While it has not previously been possible to in situ measure a time profile of invasion during and immediately after drilling, such information could be of immense importance to reservoir engineers in determining the fluid permeability of rock formations in the virgin form encountered by the drill bit. Estimates of this data are obtained by wireline formation tester logging tools, but often are inaccurate due to the difficulty of mechanically displacing fluids in a localized area of the borehole wall and of overcoming the effects of previous formation invasion.

Finally, it is sometimes difficult for wireline logging tools to acquire information due to mechanical difficulties after drilling through poorly consolidated formations or in smaller borehole diameters. It is possible that a well may have to be abandoned due to the inability to use wireline tools or to equipment failure. Clearly, if a measurement while drilling could be made that provides data of equal quality to the wireline tool (accuracy, thin bed resolution, invasion corrected, etc.), then it would result in significant operational and economic benefits. This might avoid delay to run wire line tools.

One of the advantages of the present invention derives from the fact that three different depths of measurement are incorporated in an MWD tool. In the preferred and illustrated embodiment, a drill collar is constructed having an axial passage for delivery of mud flow through the lower end of the collar and it is preferably located just above the drill bit. Indeed, it comprises the lower part of several drill collars typically found in a drill string. Moreover, it supports coils on the exterior used to form fields in the adjacent formations to make measurements. Measurements are made at three depths which are generally a shallow measurement which is obtained at a relatively low frequency, and higher frequency coils are used to make investigations at intermediate and maximum depths of investigation. This arrangement of the equipment enables resistivity to be determined at three depths which is significant for obtaining data with regard to the rate of filtrate invasion into the formations.

Consider as an example a well where the drill bit is momentarily totally within a non-producing formation which is substantially impervious to the penetration of filtrate. As the drill bit passes through the lower interface of that formation and enters a producing sand formation, there is a consequential flow of filtrate out of the drilling fluid into that formation. Assuming that a pressure differential does prevail and some portion of drilling fluid will enter the formation, the filtrate will displace the connate fluids. In ordinary circumstances, one can presume that the formation is axisymetric about the well borehole and the filtrate will therefore flow radially outwardly in an equal omnidirectional fashion. The filtrate rate of flow measured radially from the borehole requires typically several hours, and indeed several days, to reach the distance from the borehole at which the deepest area of investigation occurs. The sensors supported on the drill collar are positioned so that measurements are made at the three depths, and provide this information regarding invasion in the midst of the filtrate invasion thereby providing data showing the virgin formation material measurements.

SUMMARY OF THE INVENTION

Accordingly, it is the purpose of the present invention to include at least three resistivity measurements with deep, medium, and shallow depths of investigation. It is a further feature of the invention to design the spatial responses of these measurements so that quantitative correction and interpretation of invasion effects may be made in a wide range of formation/borehole environments. Specifically, the mud filtrate may be of lower or higher resistivity than the connate formation fluids, resulting in what is commonly known as normal and inverse resistivity contrast. Additionally, in accordance with recent advances in wireline induction logging, it is an important part of the invention that all measurements have thin bed resolution sufficient to resolve accurately two foot thick formation features. False indications of invasion due to unmatched resolution are eliminated, unlike previous methods. Finally, a method of data processing to interpret the resistivity and invasion information and to correct for deleterious phenomena at dipping bed boundaries is included.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIGS. 6A–6F are a timing chart showing signal timing as an aid in explanation of the sequence of operations where signals are transmitted upwardly and downwardly;

DETAILED DESCRIPTION OF THE PREFERRED EMBODIMENT

Figure 1:
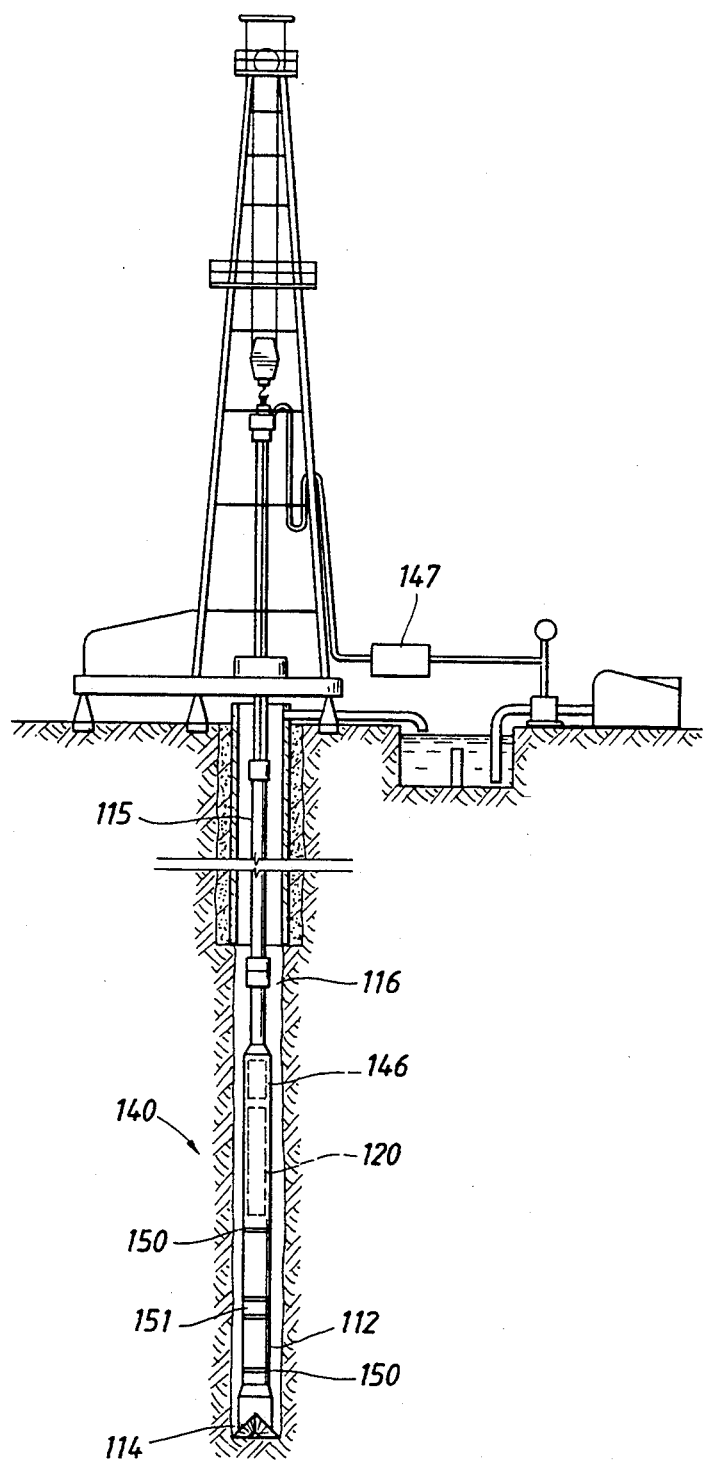
FIG. 1 schematically shows a typical MWD arrangement on a drilling well employing a system according to the present invention.

Referring initially to FIG. 1, a MWD formation property and directional measuring system is shown schematically deployed in a drilling well, the numeral 140 refers generally to the system. The drill pipe 115 supports the system 140 in a borehole 116. The system 140 generally comprises a MWD mud pulse telemetry transmitter 146, a directional measurement package 120 and an earth formation properties measuring package employing concepts of the present invention and comprising the transmitter coils 150 and receiver coil assembly 151 which are deployed in the drill collars 112 just above the rotary drilling bit 114. Measurements made by the directional package 120 and the earth formation properties measuring package are telemetered by the MWD telemetry transmitter 146 to the surface where they are received by a MWD mud pulse telemetry receiver 147.

Figure 2:
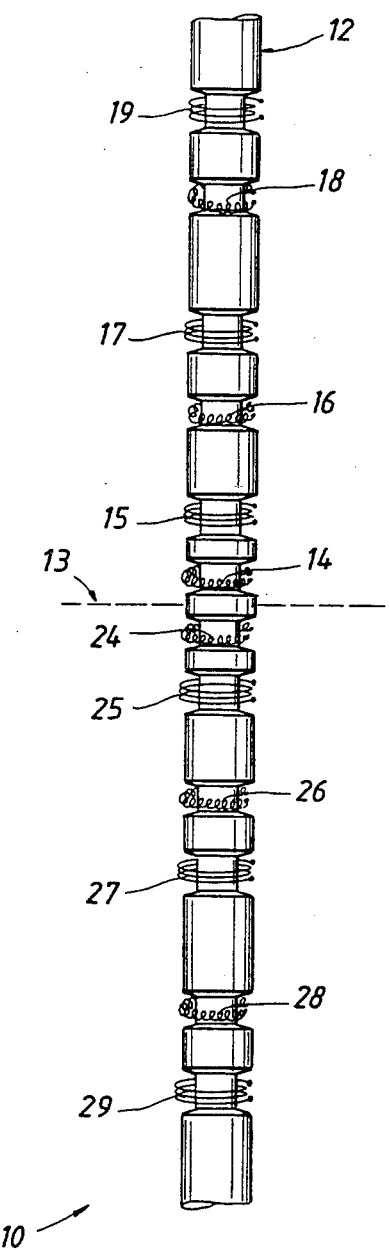
FIG. 2 shows a drill collar supporting an array of CWR and HTR coils enabling investigations at three different depths from the drill collar during MWD operations to measure resistivity before and during filtrate invasion.

The configuration of the logging tool preferably installed immediately above the drill bit and the incorporated mud pulse data telemetry system for transmission to the surface processing computer is shown in FIG. 2. This simplified view of the drill collar is shown with the electromagnetic sensors mounted around the tubular metal drill collar or mandrel, and the sensors connect with electronic circuits to generate and transmit to, and to measure received signals from the surrounding rock formations. The coil shaped sensors include shielded axial coils that are associated with 2 MHz electromagnetic waves passed through the rock, and also has toroidal coils containing permeable magnetic material that are associated with 2 KHz currents formed in the adjacent formations. All coils are disposed in a symmetrical array around a common measure point 13 corresponding to the position along the tool axis of maximum response to formation properties. A common measure point is useful because the data from any given portion of the tested formation at different radial depths should be acquired simultaneously (assuming invasion is occurring rapidly) to allow for most accurate interpretation.

Signals are communicated between sensors and electronic circuits (FIGS. 3 and 4) by means of shielded cables to prevent cross talk of signals from transmitter sensors into receiver circuits and vice versa. Cross talk can result in measurement errors that are very difficult to correct. The shielded cables pass through longitudinal grooves in the mandrel immediately underneath the sensors. Each sensor is formed by loops on a bobbin, and the bobbin is sealed (e.g., by epoxy resin potting) against ingress of corrosive borehole fluids, and the cables and electronics are also sealed. The entire assembly may conveniently be demounted for repair and replacement of any defective sensor. It will be readily appreciated that the coils and cables are exposed to severe environmental conditions during drilling and that the operating lifetime of component parts is not unlimited, necessitating easy repair.

Attention is directed to FIG. 2 of the drawings where the numeral 10 identifies the formation properties MWD tool. It is structurally mounted on the drill collar 12 which is preferably installed in the drill stem at the very lower end and is preferably immediately above the drill bit. This positions the equipment of this disclosure as close as possible to the drill bit so that data can be obtained immediately upon penetration of permeable formations. It is particularly of interest to measure the rate of fluid invasion of the drilling fluid into the formations. More particularly, drilling proceeds as the drill bit is advanced on rotation of the drill stem and is accompanied by continuous flow of drilling fluid through the drilling collar 12. It is provided with a central axial passage to deliver the drilling fluid to the drill bit. The region around the drill bit is flushed by the continuous flow, and the drill fluid is returned to the surface in the annular space on the exterior of the drill collar 11. Customarily, the drilling fluid is formed of weight material added to water, and the weight material makes up a mud cake which is deposited against the side wall of the well borehole. The mud cake is more dense than the drilling fluid after loss of water (filtrate) which is forced into the formation by any pressure differential between borehole and formation pressure that is placed on the drilling fluid. If the well borehole penetrates a highly permeable formation, a substantial fluid portion of the drilling fluid of the well borehole can pass into the formation and is labelled the invasive filtrate. Generally, the filtrate comprises water having soluble salts and other materials in it. Also, the filtrate can be relatively conductive because the concentration of soluble salts in the filtrate can be relatively high.

Drilling fluid thus serves the purpose of removing the cuttings from the drill bit, and it also provides a mechanism whereby formation pressure is kept under control. Ideally, the pressure on the drilling fluid is equal to and preferably slightly greater than the ambient pressure prevailing in the formation. This prevents mixing of oil and gas materials into the drilling fluid which might otherwise thin (or cut) the drilling fluid, reducing its density, to thereby engender the risk of a blow out.

Returning to FIG. 1, the drill collar 12 terminates at conventional pin and box connections. A mud pulse mechanism is controlled by the electronics, and forms a pressure pulse or surge which is conveyed up the column of standing mud in the drill stem so that a mud pressure pulse can be detected at the surface.

FIG. 2 shows a set of coils which are located on a drill collar. The CWR (compensated wave resistivity) coils are wound axially around the drill collar (as a support) so that the coils of FIG. 2 form flux lines axially of the drill collar or coaxially with the borehole. The CWR operates at approximately 2 MHz. The flux is therefore axial. The CWR coils will be collectively discussed with regard to FIG. 3 operation. By contrast, the HTR (high resolution toroidal resistivity) coils of FIG. 2 are wound on magnetically permeable toroidal forms (not shown) positioned in external grooves. The toroidal cores can be circular in cross section or can be approximately rectangular in cross section with the coil wound around the core. This will be discussed further in regard to FIG. 4. The HTR coils are located symmetrically above and below a central measuring point located at the plane 13. The HTR operates in the frequency range of a few kilohertz. Several coils are deployed symmetrically above and below the measure point 13. The measure point 13 thus defines the center of the coils deployed. The system incorporates six coils deployed above the measure point 13 and six coils deployed below. The two coil sets (CWR and HTR) are arranged symmetrically with regard to the measure point 13. Proceeding from the measure point in both directions, the numeral 14 identifies the low frequency HTR upper receiver coil. In similar fashion, the numeral 24 identifies the corresponding lower HTR receiver coil symmetrically arranged. In addition there is a high frequency CWR upper receiver coil 15 and a similar lower CWR receiver coil 25. Further a low frequency HTR shallow upper transmitter 16 is included. A lower similar HTR transmitter coil 26 is included in the structure. The numerals 17 and 27 identify the CWR medium depth upper and lower transmitter coils. A low frequency HTR deep transmitter coil is likewise provided at 18 above the measure point of the tool and the corresponding lower deep HTR transmitter coil 28 is shown. The HTR coils 18 and 28 are involved in other measurements and are not shown in FIG. 4; their relative position enables a deep measurement (deeper than that obtained from the coils 16 and 26) should it be desired. The numerals 19 and 29 identify the most remote coils which are the upper and lower deep CWR transmitter coils. Corresponding numbers will be assigned to corresponding coils shown in FIGS. 3 and 4 to aid in the explanation.

For specific identification purposes, the terms upper and lower refer to the location of the respective coils either above or below the measure point 13. In addition to that, the term shallow refers to a system which investigates at shallow radial depths about the well borehole. There are three radial depths of investigation which are generally identified as shallow, medium or some times intermediate, and also deep. These radial depths of investigation in one model of the equipment extend about 60 inches from the axis of the equipment. In this particular example, the shallow radial investigation depth might be in the range of about 15 inches from the borehole axis while the next depth or the intermediate radial depth is perhaps 36 inches while the deepest radial penetration is 60 inches. Note that these relative distances refer to a location radially out from and concentric about the axis of the equipment in the well borehole assuming that the equipment of FIG. 2 is approximately centered in the well borehole. This is normally the case and normally prevails in most drilling circumstances. Moreover, this also assumes that the well borehole is concentric and is sufficiently defined by the formations. It is possible that an unconsolidated sand will slough off and destroy the cylindrical shape of the borehole. However, the foregoing depths of investigation are typical for the uncased well borehole. The depth of investigation can be varied with change of scale factors and positioning of the coils in FIG. 1, change of frequency, change of power and implementation of other changes in the system.

HIGH FREQUENCY CIRCUIT

Figure 3:
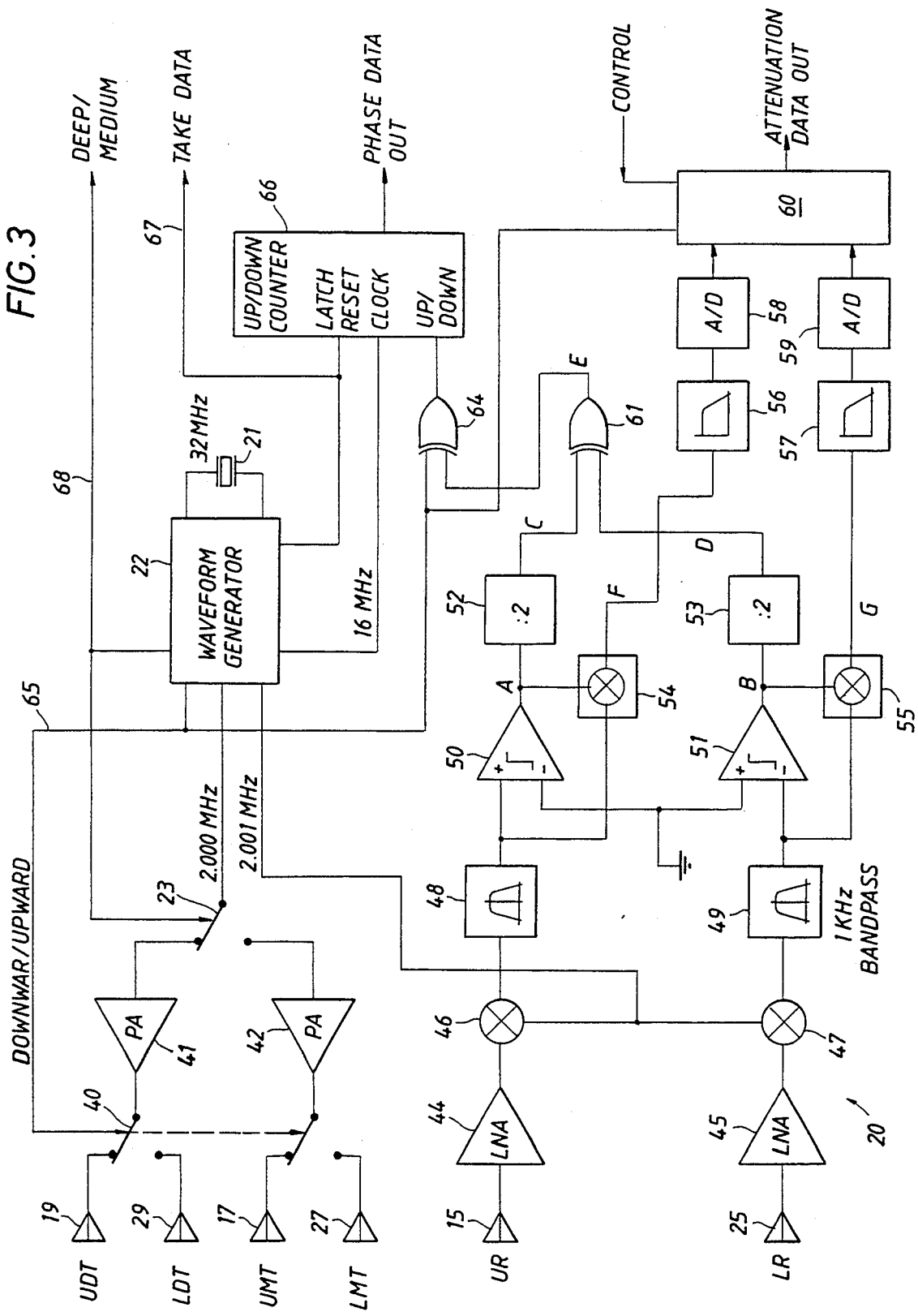
FIG. 3 is a schematic block diagram of the high frequency circuitry CWR of the present apparatus and further shows how that circuitry connects with the transmitter and receiver coils positioned on the drill collar in FIG. 2.

Going now to FIG. 3 of the drawings, the high frequency CWR system for performing the medium and deep radial investigations is shown and is identified generally by the numeral 20. The system 20 utilizes the coils which are marked in FIG. 3 of the drawings. At megahertz frequencies such as two or three MHz, the steel material of the drill collar does not act as a magnetic material. The installed coils are wound around a ring of sheet material which is a good electrical conductor. The ring and loops of wire are recessed in a circular groove for protection from abrasion during use. The several transmitters utilize a crystal controlled waveform generator. There is a crystal operative at 32 MHz indicated by the numeral 21. It provides a stabilized frequency signal for a waveform generator 22. In turn that is connected by means of a relay 23 to provide a high frequency signal. Frequencies will be discussed momentarily.

The transmitter system utilizes identical power amplifiers 41 and 42 which are output through ganged contacts in an output relay 40. The relays 23 and 40 operate together to control routing of the output signal. They control application of the transmitter drive signal to one of the four coils shown in FIG. 3 of the drawings. More particularly, the system uses in the preferred embodiment a 32 MHz stabilized crystal oscillator. That signal is divided by a divider circuit in waveform generator 22 and is reduced to 2.000 MHz. That frequency is applied to the respective selected transmitter coil. Control of this is accomplished through the relays 23 and 40 as mentioned. The transmitted signal is received at the receiver coils 15 and 25. FIG. 3 shows these coils connected with identical low noise amplifiers at 44 and 45.

These amplifiers form outputs provided to duplicate mixers 46 and 47. The mixers 46 and 47 are provided with an input signal at 2.001 MHz from the waveform generator 22. The difference output of the mixers 46 and 47 has a frequency of 1,000 Hz and preserves the amplitude and phase of the input signals. The two mixers connect with duplicate band pass filters 48 and 49. In turn, the filters 48 and 49 are connected to duplicate zero-crossing detectors or comparators 50 and 51 forming outputs at A and B. The comparators 50 and 51 form outputs furnished to similar divider circuits 52 and 53. The two divider circuits form outputs which are labelled C and D and which are provided as inputs to an exclusive OR circuit 61 which forms an output at E indicative of relative phase of the input signals. This signal in turn is applied as an input to an XOR gate 64 which is used to control up/down counting in a counter 66. The signals at A, B, C, D, and E are detailed in FIG. 6 in discussion of the relative timing of these waveforms. As observed in FIG. 3, the two receiver coils 15 and 25 connect with duplicate processing channels which are identical up to the XOR gate 61. The dual channels additionally incorporate phase sensitive detectors at 54 and 55. The two detectors 54 and 55 form output signals to appropriate low pass filter circuits 56 and 57. In turn, these low pass filters connect to analog-to-digital converter circuits 58 and 59. In turn, the A/D converters 58 and 59 connect with an output data buffer 60. The buffer 60 contains an output data stream which is indicative of relative amplitude of the input signals as will be described.

The waveform generator 22 forms clock signals and control signals which dictate certain switching sequences. The waveform generator 22 thus provides an output signal on the conductor 65 which switches between transmission of the 2 MHz signal into the formation from either the upper (17 and 19) or the lower (27 and 29) transmitters. The signal on the conductor 65 provides this control signal for the relay 40 to control transmitter switching. In addition, the conductor 65 is one of the two inputs for the XOR gate 64 and the data buffer 60. The gate 64 is provided with that input control signal and also the signal at E output by the XOR gate 61 which, it will be recalled, is indicative of the phase of input signals C and D with respect to each other. The output of the XOR gate 64 is therefore the variable duty-cycle control signal which represents the phase shift of signals at the receiver coils 15 and 25, and is input to an up/down counter 66. The counter 66 has several inputs. A conductor 67 is input from waveform generator 22 to provide the necessary trigger which controls counting by providing a latch and a reset signal and is also output to external data transmission circuits (not shown). In addition to that, the waveform generator 22 forms signal at a clock frequency, typically 16 MHz to the counter 66.

The manner in which resistivity data is used involves explanation of the operation of the high frequency system shown in FIG. 3 of the drawings. This is more readily understood by going now to FIG. 6 of the drawings. Briefly, FIG. 6 of the drawings shows the waveforms (indicated by the letters A through E) originating in the lower portion of FIG. 3 of the drawings. The solid line representation shows the signals from the respective signal sources which are labelled by the letters A through E without formation phase shift. The signal at A shows possible phase shift in the dotted line as a result of transit time between the two receiver coils, i.e. a phase shift due to the formation resistivity. The left side of FIG. 6 shows the waveforms at the circuit at signal test points A through E when transmitting upwardly while the right side shows the same signals when transmitting downwardly. The data output of the counter 66 is shown at the bottom of FIG. 6 for transmission both upwardly and downwardly.

The values shown in FIG. 6 and marked on the curves include the phase shift error e which arises from the coils and electronic components or from tool eccentering in the well borehole. The symbol $\Phi$ is the phase shift in earth formations between the two receivers. It is desirable to measure $\Phi$ accurately and reduce e to the smallest value possible. As shown at the data output in the lower part of FIG. 6, values are provided which cancel the phase shift error e as will be described.

In FIG. 6, the solid lines show the operation of the system without formation phase shift. The dashed lines show the system operation with a formation phase shift $\Phi$. There is a sequence of measurements including forming a transmission upwardly in the borehole followed by an equal time period of transmission downwardly.

A ratio quantity referred to as the duty cycle a/d in FIG. 6 is measured during each of these time periods. The quantity a represents the time period of upward incrementing in the counter 66 of the 16 MHz clock pulses, while the quantity b represents the time period of downward decrementing in the counter 66 of the 16 MHz clock pulses. At the end of the upward transmission period, the counter 66 contains an accumulated count representative of the duty cycle a/b, which is in turn representative of the apparent phase shift $\Phi$ upwardly through the formation plus the error e.

The downward transmission period is now performed without resetting the counter 66. However, the gate 64 is conditioned by control line 65 to reverse the order of incrementing and decrementing of the counter 66. This conditioning is necessary because of the change in algebraic sign of $\Phi$ with upward and downward transmission caused by wave propagation through the formation. Thus the total accumulated count in the counter 66 at the end of this period is representative of twice the formation phase shift $\Phi$ with the error e cancelled. This entire sequence is repeated while exciting the deep transmitters 19 and 29, and the medium transmitters 17 and 27 as determined by a control signal on the line 68 provided by the waveform generator 22.

Referring again to FIG. 3, the CWR attenuation measurement is performed by measuring the amplitudes of the two received signals in the detectors 54 and 55, low pass filters 56 and 57, and A/D converters 58 and 59. The signals are labelled F and G in FIG. 6. The low pass filters 56 and 57 remove all high frequency components from the signals F and G, leaving a direct current signal for the A/D converters 58 and 59 to convert. The A/D converters 58 and 59 both operate during upward and downward transmission times. Means are provided in the buffer circuitry 60 to calculate the ratio of the amplitudes for both upward and down transmissions and to then calculate the product of these ratios according to the following relationship:

$$A^2 = \frac{A_{D1}}{A_{D2}} \cdot \frac{A_{U2}}{A_{U1}}$$

where

A = formation attenuation,

U=upward transmission,
D=downward transmission.
1=receiver channel 1, and
2=receiver channel 2.

When the numerical value of $A^2$ is analyzed in data processing, ½ logarithm ($A^2$) is plotted on the log to provide A, or the attenuation.

Figure 5:
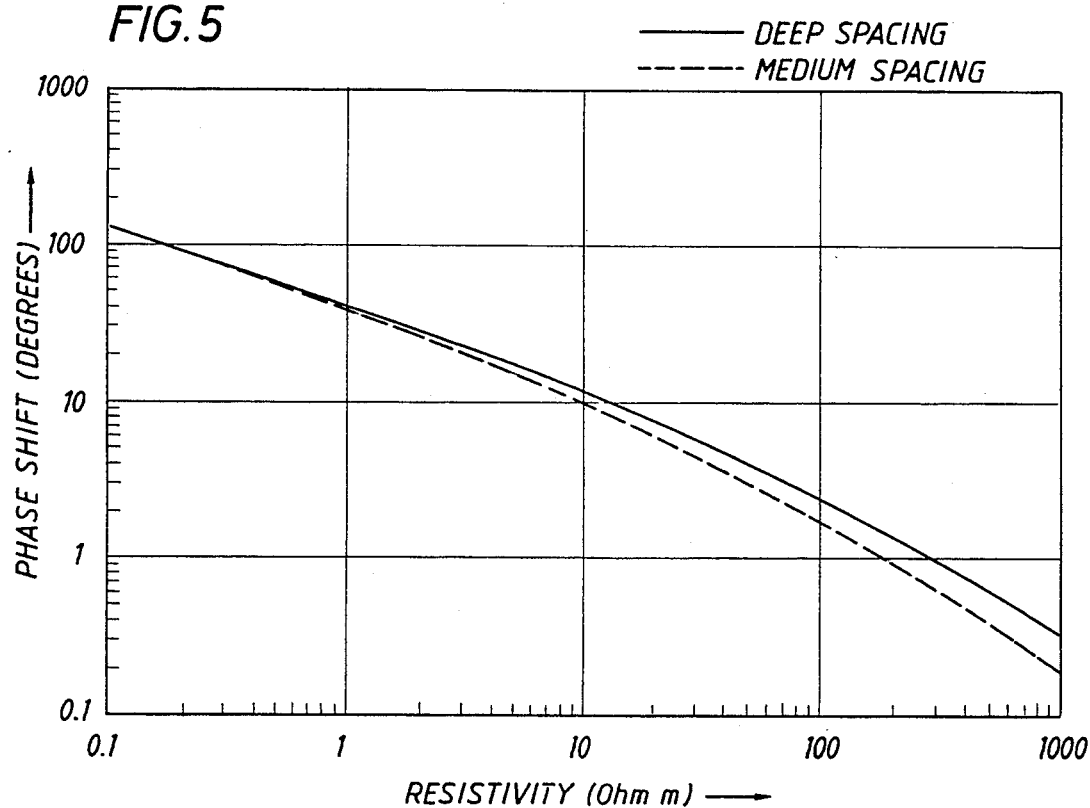
FIGS. 5 and 5A show different curves of phase shift and attenuation with respect to resistivity for the intermediate and deep spacing coils on the drill collar of FIG. 2.
Figure 5A:
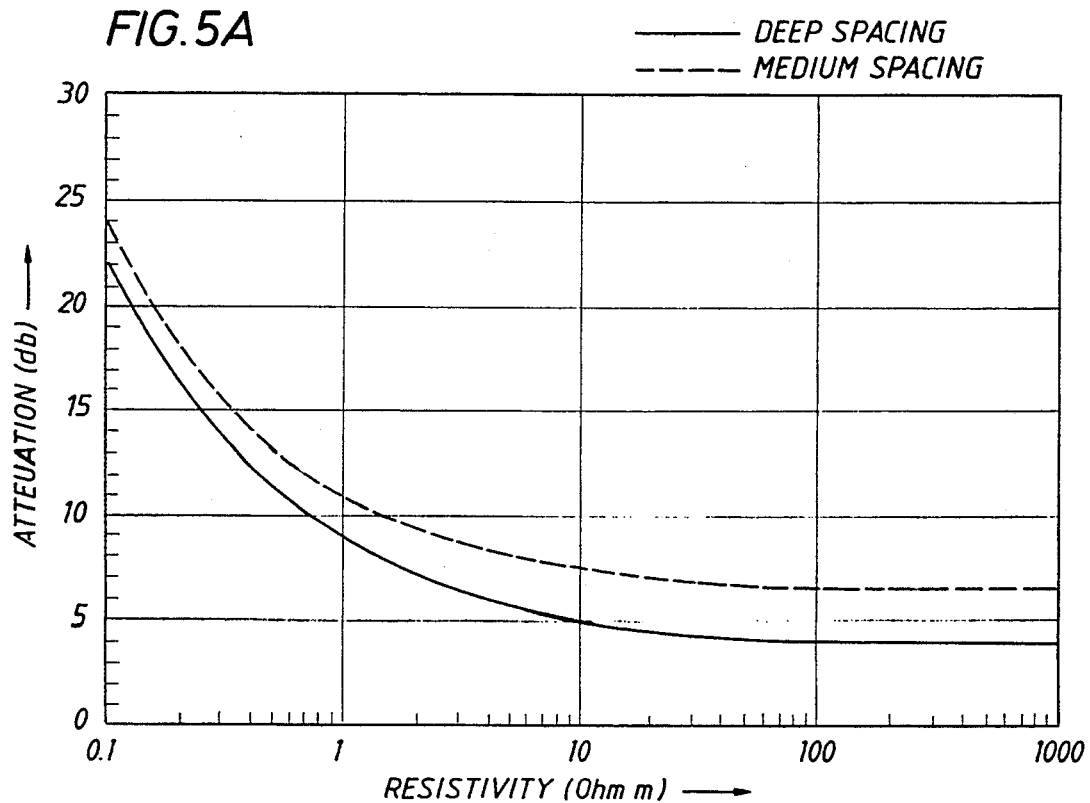

In the present invention novel methods are employed to provide precise phase shift and attenuation measurements corrected for any systematic errors in the sensors, cables or electronic circuits. The data transfer rate of available telemetry systems used in MWD measurements is likely limited and it is imperative to minimize the band width required, particularly with multiple depths of investigation which create multiple channels of data. One purpose of the measurements is to determine the phase shift between signals arriving at the two receiver sensors 15 and 25 and the relative amplitudes thereof, corresponding to the phase shift and attenuation of an electromagnetic wave traversing a distance in the rock formation essentially equal to the spacing between the receiver sensors. In view of Maxwell's equations for electromagnetic waves, and including physical details of the sensor coils placed on the metal mandrel within a borehole for a wide range of formation resistivities, FIGS. 5 and 5A of the drawings show the relation between measured data and rock resistivity. It will be noted that, at high resistivity, the phase shift falls to fractional degree levels and attenuations to a few decibels. If accurate determinations of resistivity are required, then the resolution must be on the order of about 0.001 degree and one tenth of a decibel. Due to the slope of the curve at the left hand side of FIG. 5, a very small error in phase measurement results in a large error in resistivity determination; the need for accuracy becomes evident. Fortunately, the attenuation measurement is only required in low-resistivity formations so a less stringent specification is normally needed.

The preferred solution derives from the compensation method wherein two transmitters are sequentially energized at equal distances each side of the two central receiver sensors 15 and 25. The measured quantities determined from each transmitter (phase shift and the logarithm of attenuation) are arithmetically averaged over time. The dual direction transmission system with two receivers provides quality cancellation of perturbations due to the presence of borehole fluids around the sensors and variations in borehole diameter within a distance equal to the spacing between receiver sensors. There is the very beneficial corollary effect of an instantaneous cancellation of all errors within the measurement system. The arithmetic averaging performs the function of matching the two parallel receiver systems so that errors due to component variations or resulting from temperature drift are reduced to the trivial level of changes occurring in the time between sequential transmitter cycles. Since the system cycle is short, this error source can be as short as a small fraction of a second, and errors become insignificant.

In summary, the high frequency receiver has a pair of receiver sensors 15 and 25 which are fed to the exclusive OR gate 61 and the up/down counter circuits 66. These circuits perform the function of generating a rectangular wave whose duty cycle varies from 0–100% in proportion as the receiver input signals relative phase shift varies from $-180°$ to $+180°$. This rectangular wave controls the up or down counting of the counter 66 receiving the high frequency clock (16 MHz) pulse train, with the result that a running average or integral of the mean duty cycle or phase shift is accumulated in the counter 66. As shown in the sequence of signals in FIG. 6, sequential periods of signal averaging with the upper transmitter and lower transmitter energized (and synchronous switching of the polarity of the rectangular wave) perform the mentioned additional function of "borehole compensation." After a suitable period of count accumulation to attain an optimum signal-to-noise ratio due to signal averaging, the total count (representing phase shift) may be read out from the counter 66 and transmitted to the surface for conversion into an equivalent resistivity. The phase shift measurement is the most accurate indication of formation resistivity and it is utilized with the deep spaced pair (upper and lower) of transmitter coils 19 and 29 as well as with a medium spaced pair of transmitter coils 17 and 27 to provide resistivity logs with deep and medium radial penetration, respectively.

SHALLOW MEASUREMENT

Figure 4:
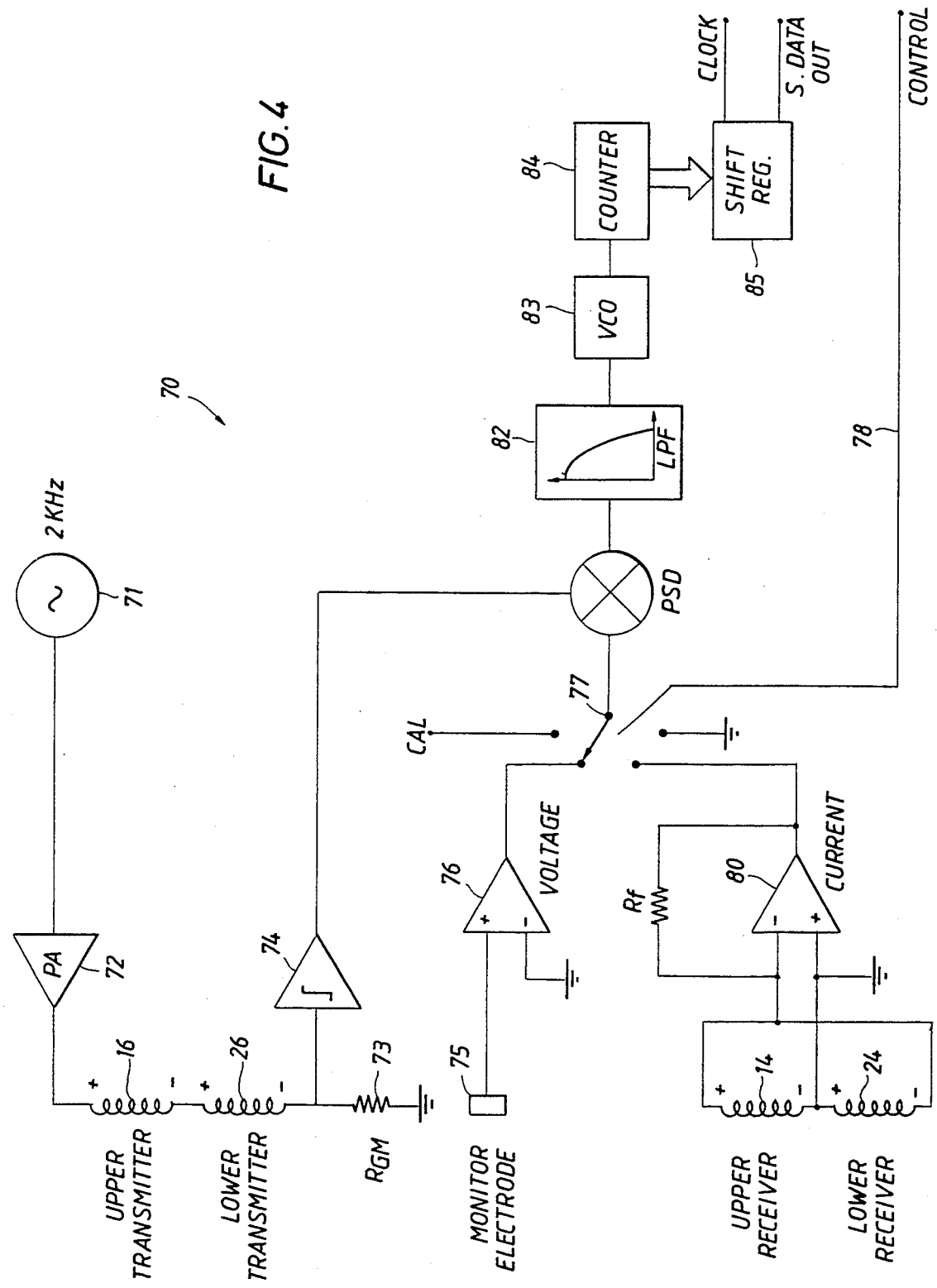
FIG. 4 shows additional circuitry found in the apparatus which is used for operation at relatively low HTR frequencies to obtain resistivity on a shallow investigation, and further shows transmitter and receiver coils positioned on the drill collar shown in FIG. 2.

FIG. 4 shows a low frequency HTR system which is indicated generally by the numeral 70. This system incorporates the transmitter and receiver coils 14, 16 and 24, 26. It is a system which is driven by an oscillator 71. The 2 KHz signal from the oscillator 71 is provided through a power amplifier 72 and then is delivered to the upper and lower transmitter coils 16 and 26. Recall that these coils are illustrated in FIG. 2 with respect to the measure point on the mandrel which supports them. The two coils are deployed at selected distances from the receiver coils 14 and 24. The transmission system also includes a load resistor 73. When the transmission occurs, a voltage signal indicative of the current transmitted into the borehole and formation is developed across the load resistor 73 and is coupled through a comparator 74 operating as a zero crossing detector.

The system further includes a monitor electrode 75 on the mandrel. This electrode provides an input to an amplifier 76. The output of the amplifier 76 serves via switch 77 as an input to a phase sensitive detector 81. The multiplex switch 77 is operated by a signal on the conductor 78 from a switch control source which enables switching so that the system forms an output which is either the current flow in the receiver coils 14 and 24 or alternately, the voltage output from the monitor electrode 75. Also, there is a calibration terminal as well as a ground input terminal on the multiplex switch 77.

The two coils 14 and 24 are jointly connected to an input transimpedance amplifier 80. The amplifier 80 is equipped with a feedback resistor $R_f$ defining an output voltage related to the current signals in the two coils. It will be observed that the coils are connected with polarity such that the current signals are subtractive. The amplified signals are input to the switch 77 and, when switched to the current sensing mode, the switch 77 provides output from the coils to the phase sensitive detector 81. The phase sensitive detector 81 is also provided with the phase reference signal from the zero crossing detector 74. The in phase signals are detected by detector 81, and then delivered to a low pass filter 82 which provides a DC output to a voltage controlled oscillator (VCO) 83. The VCO connects with a counter 84 which adds pulses. The counter 84 provides an output to a shift register 85. By means of a controlled clock signal input to the shift register 85, the total stored in the shift register 85 is periodically transferred out. By timing the reset of the shift register 85 the low frequency shallow resistivity measurement system of FIG. 4 provides a digital number periodically which is indicative of formation current. This current is inversely proportional to the formation resistivity. When the switch 77 selects the output of the amplifier 76, a digital number indicative of the formation voltage at the measure point 13 induced by the transmitters 16 and 26 is obtained. The current and voltage measurements are subsequently combined to determine formation resistivity. It will be recalled that the spacing of the transmitter coils 16 and 26 of FIGS. 2 and 4 is close to the receiver coils 14 and 24. This limits the depth of investigation to relatively shallow radial values.

Returning now to FIG. 2 of the drawings, it will be seen that the low frequency coils are symmetrically arranged around the measure point 13. This alignment assists in enabling measurement in a region which is close to the drill stem, and which is immediately above the drill bit. This deployment of coils in near proximity to the drill bit assists measurably in obtaining dynamic measurements of the formations immediately after the drill bit has penetrated into a formation. This enables the system to provide measurements of the formation resistivity before drilling fluid filtrate flows out of the well borehole into the permeable formation and modifies formation resistivity. As mentioned earlier, the HTR measurement is relatively shallow using closely positioned toroidal coils 16 and 26. If desired, a slightly deeper measurement can be obtained by using coils 18 and 28 as an alternative.

DYNAMIC FLUID INVASION IS MEASURED

The three different depths of investigation of the CWR and HTR coil system enable measurements from a single formation to be obtained and in particular enables this set of data to be obtained before fluid invasion has occurred at all depths. There is, of course, a time lag in the penetration of the filtrate into the formation. Assuming that the drill bit is first drilling in an impermeable formation and then punches through into a permeable sand having petroleum products in it, the fluid pressure acting on the drilling fluid will force a portion of the filtrate into the formation. The rate of penetration is dependent on a number of factors including the pressure differential between the formation and the drilling fluid, the permeability of the rock, the viscosity of the drilling fluid, and many other factors. Ordinarily, the drilling fluid filtrate leaches into the permeable rock rather slowly. The present invention enables measurements to be taken from that formation indicative of resistivity prior to invasion. It also enables measurements to be obtained during invasion. So to speak, the invasive fluids which practically always have a different resistivity than the connate fluids will provide resistivity measurements which are uninvaded, partially invaded and completely invaded. This enables more information to be determined regarding the formation and further assists in well completion procedures which are dependent on the formation resistivity ideally without invasion.

A shallow depth of investigation is provided by the HTR 2 KHz measurement using the toroidal coils 16 and 26. The spacing of the CWR transmitter sensors 129, 29, 17, and 27 is selected so that an optimum combination of spatial responses is obtained, allowing an interpretive method shown in FIG. 7 where the three measurements are combined in a crossplot to perform graphically a solution of an abrupt boundary model of invasion. Values of the resistivity for the undisturbed rock $R_t$, the invaded rock $R_{xo}$, and the diameter of invasion $d_i$ may be inferred from the phase shift of the deep and medium CWR wave propagation sensors and the resistivity from the shallow HTR toroidal sensors. While FIG. 7 may be used as a visual aid in understanding the method, typically the computation of the answers will be performed by an algorithm that takes a set of data representing the vertices of all the curves in FIG. 7 (themselves computed using a model of the tool spatial responses) and interpolates any value of input data from the logging tool on a two dimensional plane to find the interpolated answer. There are several well known methods, such as defining polynomial equations to describe each curve and making successive approximations along orthogonal curves to find an answer within a predefined error margin. Use of readily available digital computers allows the almost immediate display of the answers while logging and drilling is proceeding.

Figure 7:
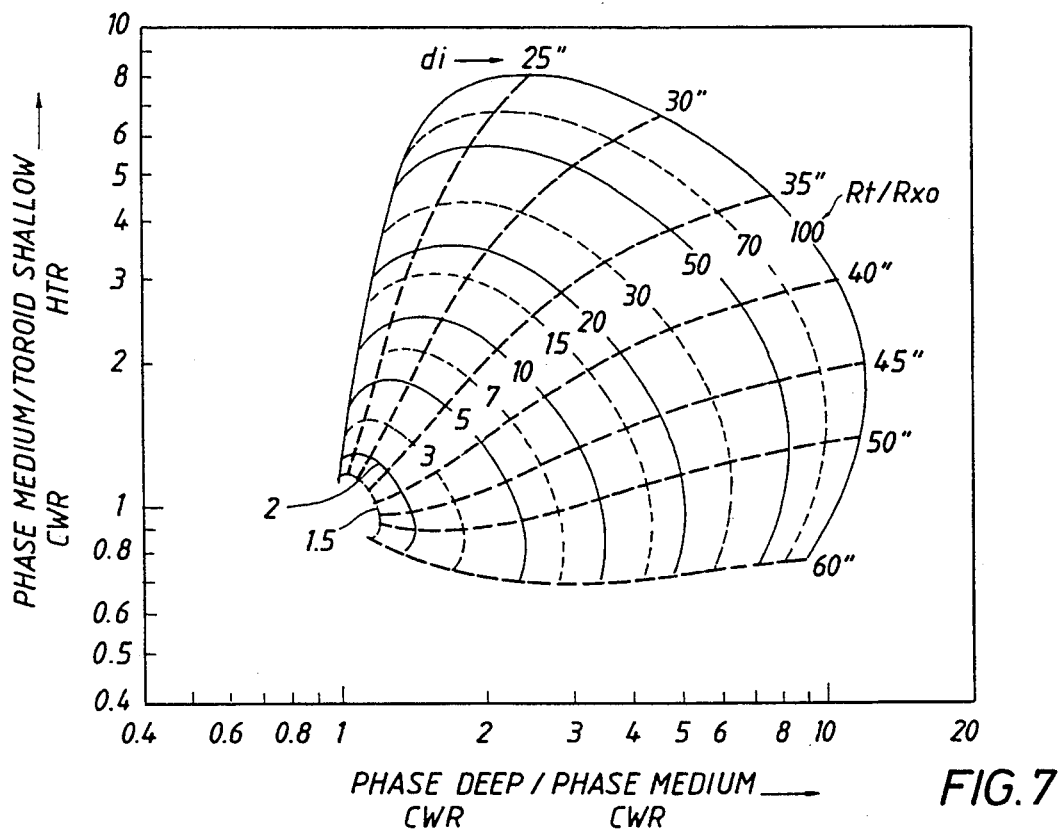
FIGS. 7 and 8 show different tornado charts representing resistive and conductive fluid invasion.
Figure 8:
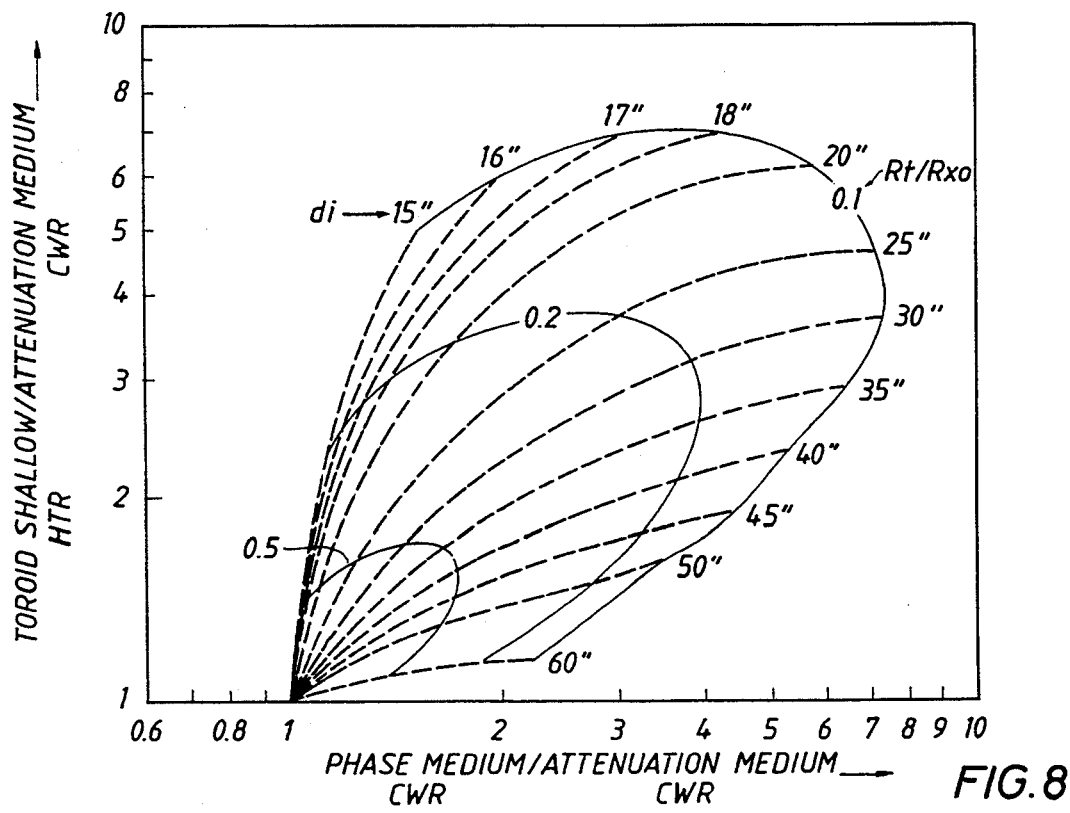
Figure 12:
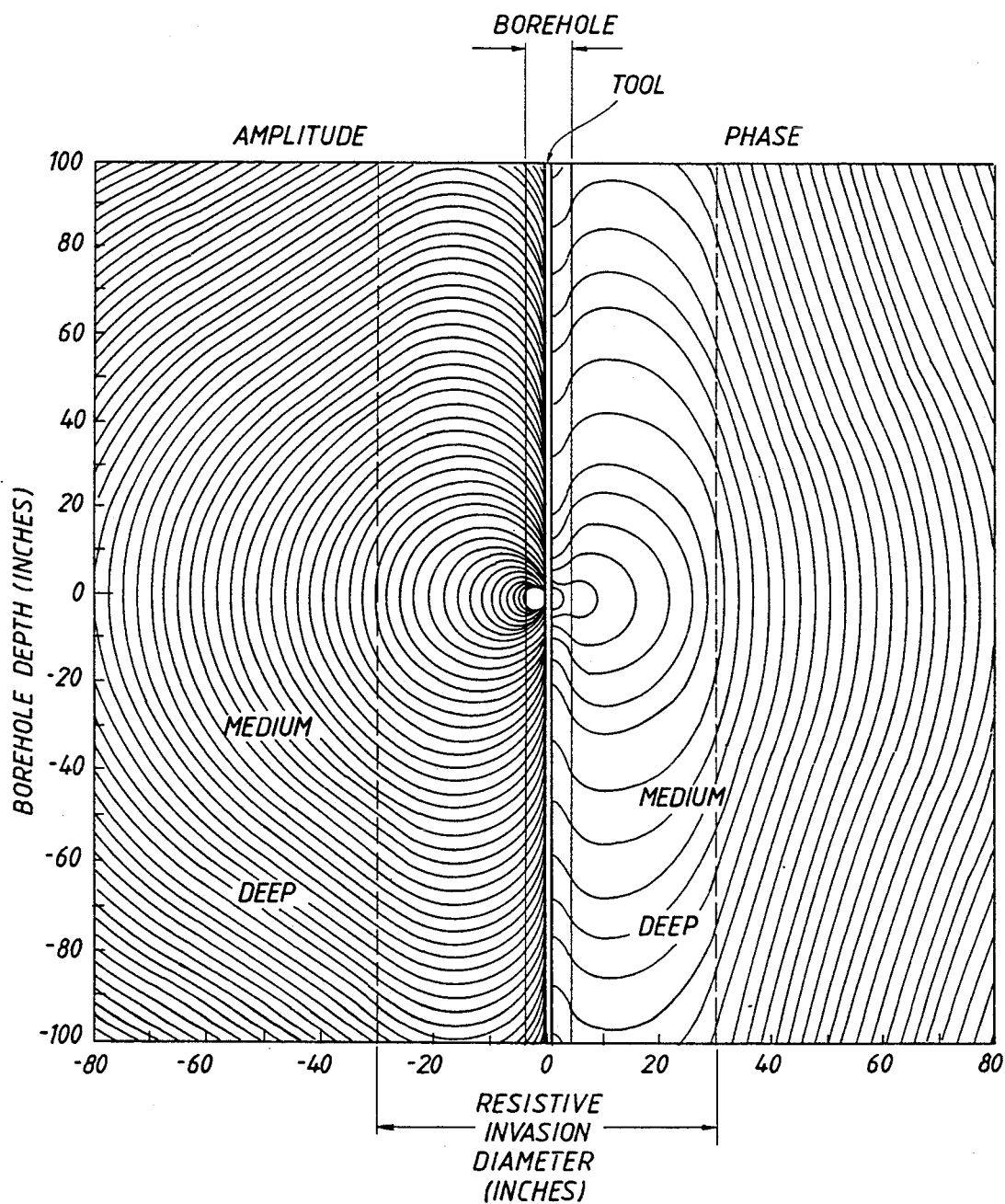
FIG. 12 is a profile of amplitude and phase on opposite sides of the well borehole showing amplitude on the left and phase angle on the right.

The solution set of responses in FIG. 7 is only one of a wide range of precomputed tool responses that may be called upon depending on the resistivity of the drilling mud filtrate (which is normally known from independent measurements) and is particular to the case where mud filtrate has lower resistivity than the fluids in the formation (the range of which is approximated from other geological data). FIG. 8 shows how the invasion data may be found when there is invasion of relatively more resistive (opposed to more conductive) borehole fluids. In this case, the method of FIG. 7 will not provide a useful answer, and a different set of log data must be used. Phase shift data and attenuation data from the medium CWR measurement are combined with the HTR toroid resistivity. In this special case of resistive invasion, shown in FIG. 12, the depth of investigation of the deep and medium phase measurements, indicated by the shaded contours varies very similarly with increasing diameter of invasion. The depth of investigation of the corresponding attenuation measurements are much less affected. Thus, within the resistive invaded zone, the attenuation measurements have disparate depth of investigation and may be used to resolve invasion diameter. This is demonstrated in the computer modeling results shown in FIG. 12, where the attenuation measurement zones (shown on the left) are compared to the phase measurement zones (shown on the right) in a cross-sectional view of the tool in a borehole with an invasion zone of 60 inches diameter.

In the case of both FIGS. 7 and 8, it may be seen that the present configuration of sensors is able to accurately respond to invasion diameter from 18 to 60 inches, corresponding to an invasion depth of 5 to 26 inches beyond the borehole wall for a borehole of typical size. This corresponds to the range of interest in logging permeable reservoir rocks during the drilling operation.

Figure 9:
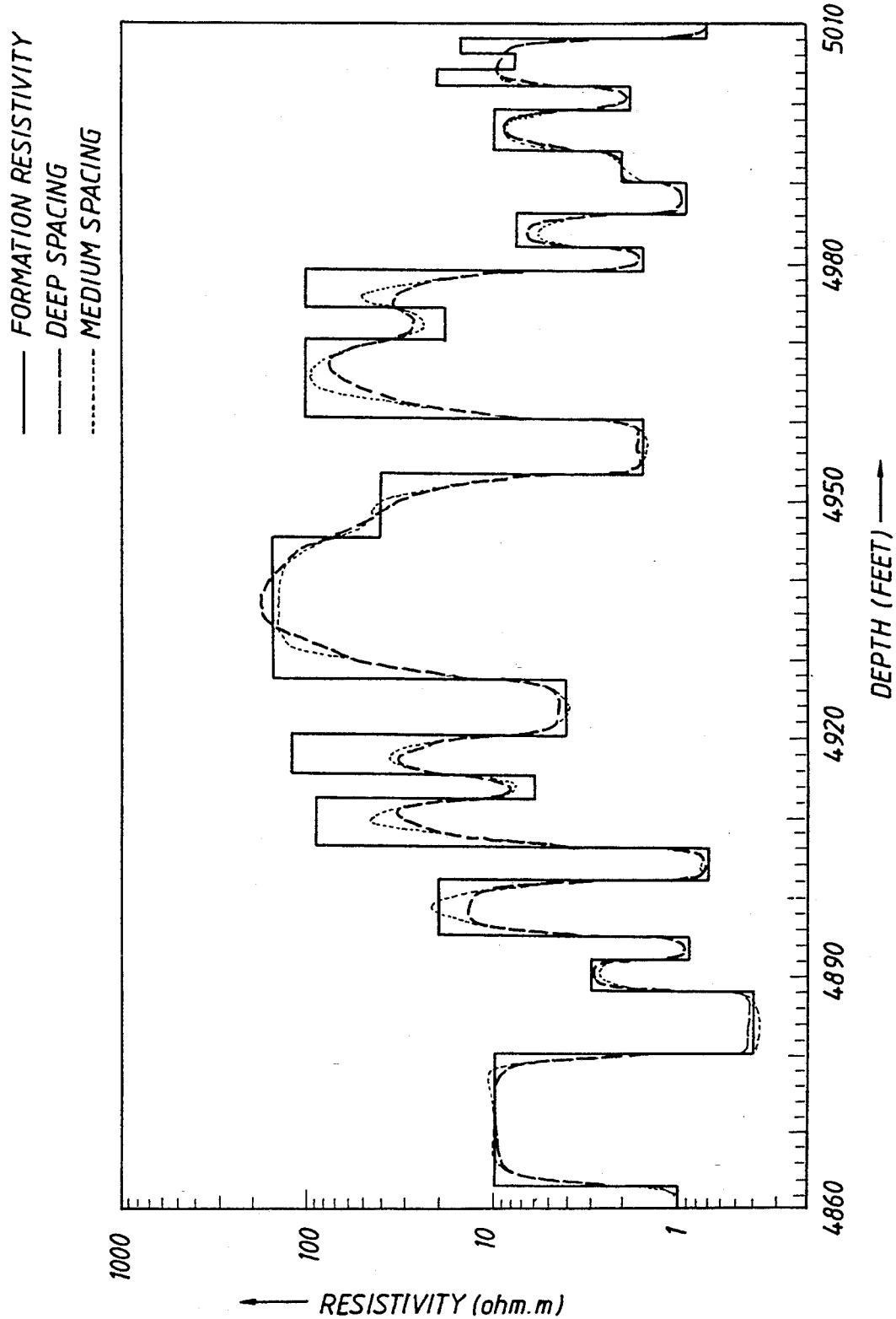
FIG. 9 shows a chart of resistivity as a function of depth for the medium and deep spacing coils on the drill collar.

With respect to the ability to resolve thin laminar beds oriented normally to the borehole axis, an example is shown in FIG. 9 of the computed response to an artificial formation of various bed thicknesses and resistivities. The deep and medium logs (derived from phase data) are able to resolve almost all the bed boundaries and to overlay well on center bed values. Any separation between the curves may be misinterpreted as invasion and is to be avoided. The departures from true center bed resistivity are due to the influence of shoulder beds, but the errors are not significant.

Figure 10:
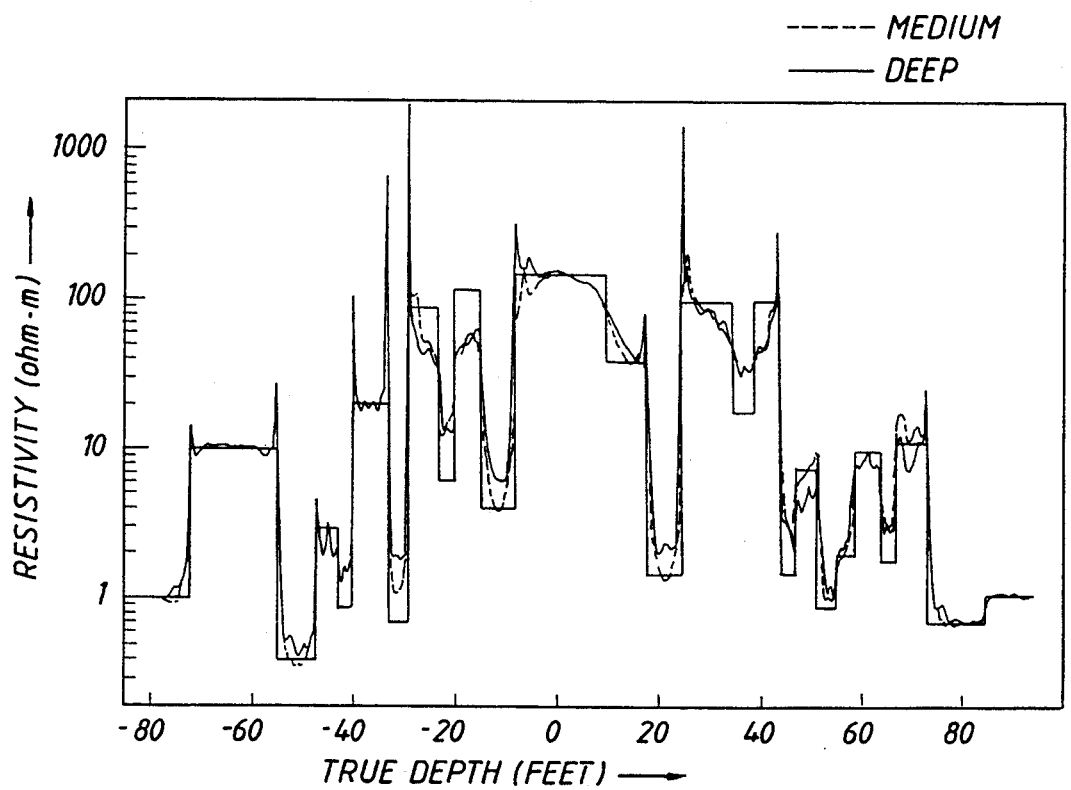
FIGS. 10 and 11 show similar comparable resistivity curves for different angles of dip.

When bed boundaries are not normal to the borehole axis, as is the case with dipping beds and/or a deviated borehole, then various undesirable phenomena become apparent, as shown in FIG. 10. Electromagnetic waves are reflected at any abrupt boundary between propagating media of differing resistivity. In general, as the Fresnel law teaches in analysis of light reflection at a reflective surface, the amount of reflection increases as the angle of incidence becomes more oblique. Any reflected wave has a velocity component in the opposite direction to the incident wave, and will contribute a component of received signal having a negative apparent phase shift. As seen in FIG. 10 at large dip angles of 60°, the logging tool indicates large spikes in apparent resistivity at some bed boundaries resulting from a lower apparent phase shift, which could be misinterpreted as thin resistive beds. Since it is not possible to separate the incident and reflected components of the wave with existing sensor designs, there remains the need to provide a corrective procedure applied to the measured data.

Figure 11:
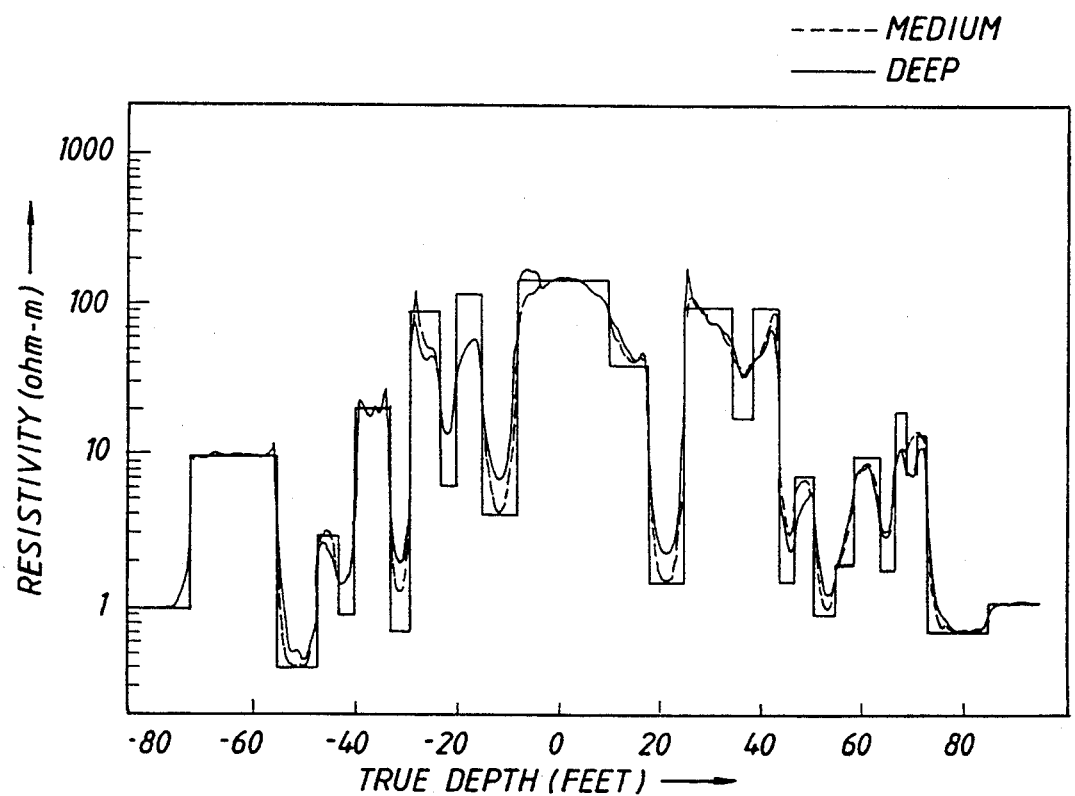

Often, other data sources will indicate a measure of dip. While a high dip angle at a bed boundary introduces an anomalous spike in the log, it also alters the spatial response of the tool because the reflected wave cancels a portion of the signal originating in the shoulder beds. This results in an increase in the thin bed resolution of the tool, which is impacted by shoulder contributions. Thus, a digital filtering scheme responsive to the dip angle (known from other well logs in the vicinity) is able to modify the effective resolution of the log data to remove the offending spikes while maintaining a nearly constant apparent thin bed response for the tool. An example is shown in FIG. 11, where the same data from FIG. 10 is filtered by an averaging process over a depth interval that varies with dip angle. If N is the number of filter stages, $\Phi$ is the dip angle, and W is a constant related to the spatial response of the sensor, then equation 1 applies:

$$N = 2 \bmod W\left(\frac{1}{\cos\phi} - 1\right) + 1 \quad (1)$$

This adjusts the filter length to give a constant true depth resolution. N is a positive integer. For a unity gain filter with a triangular distribution of the coefficient weights, the values are given by equation 2:

$$\begin{aligned} a_0 &= (N-1)/(N+1) \\ a_1, a_{-1} &= (N-3)/(N+1) \\ a_2, a_{-2} &= (N-5)/(N+1) \end{aligned} \quad (2)$$

$$a_{\frac{N+1}{2}}, a_{\frac{N-1}{2}} = 0$$

The filtering process is a convolution of the discrete sampled phase data at fixed depth intervals (for example, six inches) with the filter, thus equation 3:

$$+\left(\frac{N-1}{2}\right) \quad (3)$$

$$\phi_d = \Sigma\, a_n \phi_{d+n}$$

-continued $$-\left(\frac{N-1}{2}\right)$$

The summation $\Phi_d$ is the phase at depth d. Again, digital computers can carry out the filtering to be performed in real time. There are other filtering methods that may be employed that are well known in the art, but it is important that they be made adaptive to the dip angle as indicated above to normalize the formation data.

In summary, the log response of this apparatus in combination with data processing as described provides high quality quantitative information in a wide range of conditions similar to the best wireline logging equipment. The preferred frequencies in this measuring system are about 2000 hertz for the audio frequency. This can vary between upper and lower audio limits, say the range of 800 to 8000 hertz. The radio frequency range can vary also, say in the range of 0.8 to 5.0 megahertz. The best frequencies seem to be 2000 hertz and 2.000 megahertz, respectively. While the foregoing is directed to the preferred embodiment, the scope of the present disclosure is determined by the claims which follow.

What is claimed is:

1. A method of dynamically logging while advancing a well borehole with a drill bit connected below a coil, the method comprising the steps of:
   (a) while drilling the well borehole with the drill bit, forming a multifrequency field into formations around the well borehole wherein the field enables resistivity measurements, the field having a first frequency in the audio range and having a second frequency in the radio frequency range;
   (b) forming the field sufficiently close to the drill bit that drilling fluid invasion into the formations drilled with the well borehole is observed to change resistivity during drilling; and
   (c) forming the field at multiple times while drilling the well borehole so that fluid invasion is measured during drilling to enable preinvasion and post invasion values of resistivity to be obtained.

2. The method of claim 1 further comprising the steps of:
   transmitting values of resistivity to the surface during continued drilling.

3. The method of claim 1 wherein the first frequency is in the kilohertz range and the second frequency is in the megahertz range.

4. The method of claim 3 wherein resistivity measurements are made repetitively within a first field which extends into the formations about the well borehole, and including the steps of repetitively transmitting upwardly and alternately downwardly adjacent to the well borehole to make measurements.

5. The method of claim 3 including the steps of forming a megahertz frequency field extending to intermediate depths in the formations, and also forming a field at greater depths into the formation wherein the two depths enable measurement of phase shift and attenuation of the fields into the different depths of formation.

6. A method of measuring resistivity while drilling comprising the steps of:
   (a) with a drill stem having a drill bit at the lower end and coil means supported on a tubular member thereabove, drilling a well borehole through a formation wherein drilling is accompanied by circulating drilling fluid through the well borehole to lubricate the drill bit;

(b) forming an electromagnetic field from a coil means extending into the formation penetrated by the drill bit so that a first measurement indicative of formation resistivity without fluid invasion is obtained;

(c) forming an electromagnetic field from a coil means extending into the formation penetrated by the drill bit so that a second measurement indicative of formation resistivity with fluid invasion is obtained wherein the electromagnetic fields are formed at audio and radio frequencies; and (d) sending the first and second measurements to the surface while drilling.

7. The method of claim 6 wherein first and second fields are formed in the formations and the first field is relatively shallow, and the second field is relatively deeper than the first field in the formations to enable separate intermediate and deep measurements to be made.

8. The method of claim 6 wherein first, second and third fields are formed in the formations at relatively increasing depths.

9. The method of claim 6 wherein formation resistivity is measured at a shallow depth by a field having a frequency in the audio range, and is separately measured at intermediate and deeper depths by another field having a frequency in the megahertz range.

10. The method of claim 6 wherein resistivity measurements are made repetitively within a first field which extends into the formations about the well borehole, and including the steps of repetitively transmitting upwardly and alternately downwardly adjacent to the well borehole to make measurements of resistivity.

11. The method of claim 6 including the steps of forming a megahertz frequency field extending to intermediate depths in the formations, and also forming a megahertz frequency field at greater depths into the formation wherein the two fields separately enable measurement of phase shift and attenuation in the transmission of the fields into the formation.

12. A method of dynamically logging while drilling a well borehole with a drill bit below a mandrel serially connected in a drill stem comprising the steps of:

(a) drilling the well borehole with the drill bit;

(b) flowing drilling fluid through the drill stem and drill bit during drilling to remove cuttings from the drill bit while fluid is circulated along the borehole and invades formations adjacent to the borehole;

(c) during drilling, forming a field at audio and radio frequencies around the mandrel in formations adjacent to the borehole so that multiple resistivity measurements are obtained from the formations wherein first measurements are from formations prior to drilling fluid invasion and later measurements are from formations after drilling fluid invasion; and (d) transmitting while drilling the measurements to the surface.

13. The method of claim 12 wherein first and second fields are formed in the formations and the first field is relative shallow, and the second field is relatively deeper than the first field in the formations.

14. The method of claim 12 wherein measurements are made from three depths into the formations.

15. The method of claim 12 wherein formation resistivity is measured by a field having a frequency in the audio range, and is separately measured by another field having a frequency in the range of about two to three megahertz range.

16. The method of claim 12 wherein resistivity measurements are made repetitively within a first field which extends into the formations about the well borehole, and including the steps of repetitively transmitting upwardly and alternately downwardly adjacent to the well borehole to make measurements of resistivity.

17. The method of claim 12 including the steps of forming a megahertz frequency field extending to intermediate depths in the formations, and also forming a megahertz frequency field at greater depths into the formation wherein the two fields enable measurement of phase shift and attenuation in the transmission of the fields into the formation.

18. A method of dynamically logging while advancing a well borehole with a drill bit connected below a coil supporting mandrel wherein drilling is accomplished by continuously flowing a drilling fluid through a drill stem including the mandrel and wherein the mandrel supports coils thereon for making resistivity measurements, the method comprising the steps of:

(a) alternately transmitting upwardly and downwardly relative to the well borehole electromagnetic signals at audio and radio frequencies along the drill stem and into the formations adjacent to the well borehole wherein the transmission extends a specified depth radially in to the formations adjacent to the well borehole;

(b) receiving at two spaced locations along the mandrel the transmitted signals;

(c) measuring the phase shift between the two received signals;

(d) as a function of phase shift, determining formation resistivity; and (e) transmitting formation resistivity to the surface during continued drilling.

19. The method of claim 18 wherein the signals extend into the formations to relatively shallow depths and also to a deeper depth.

20. The method of claim 18 wherein the phase shift of the received signals are compared.

21. The method of claim 18 including the step of making repeated resistivity measurements.

22. A method of dynamically logging while advancing a well borehole with a drill bit connected below a coil supporting mandrel wherein the well borehole intercepts subsurface formations adjacent to the well borehole and the formations have a relative dip angle and the method comprises the steps of:

(a) while drilling the well borehole with a drill bit, forming electromagnetic audio and radio frequency fields extending radially outwardly therefrom into formations around the well borehole around the mandrel wherein the field enables resistivity measurements, and periodically forming resistivity measurements;

(b) serially passing the resistivity measurements through a filter means wherein the number of stages of the filter is N (a positive integer) and increasing N as the relative dip angle of the formation with respect to the well borehole increases; and (c) transmitting formation resistivity to the surface during continued drilling.

23. The method of claim 20 including the step of determining formation resistivity serially along the well borehole.

24. A method of measuring resistivity while drilling comprising the steps of:
   (a) with a drill stem having a drill bit at the lower end and coil means supported on a tubular member thereabove, drilling a well borehole through a formation wherein drilling is accompanied by circulating drilling fluid through the well borehole to lubricate the drill bit;
   (b) forming an electromagnetic field from a coil means extending into the formation penetrated by the drill bit so that an earlier measurement indicative of formation resistivity without fluid invasion is obtained;
   (c) forming an electromagnetic field from a coil means extending into the formation penetrated by the drill bit so that a later measurement indicative of formation resistivity with fluid invasion is obtained and wherein the fields of steps (b) and (c) are audio and radio frequency fields; and
   (d) sending the earlier and later measurements to the surface while drilling.

25. The method of claim 24 wherein first and second fields are formed in the formations and the first field is relatively shallow, and the second field is relatively deeper than the first field in the formations.

26. The method of claim 24 wherein first, second and third fields are formed in the formations at relatively increasing depths.

27. The method of claim 24 wherein formation resistivity is measured by a field having a frequency of about 2000 hertz range, and is separately measured by another field having a frequency of about 2.00 megahertz.

28. The method of claim 24 wherein resistivity measurements are made repetitively within a first field which extends into the formations about the well borehole, and including the steps of repetitively transmitting upwardly and alternately downwardly adjacent to the well borehole to make measurements of resistivity.

* * * * *